United States Patent
Harano

[11] Patent Number: 6,151,148
[45] Date of Patent: Nov. 21, 2000

[54] OPTICAL AMPLIFIER RELAY TRANSMISSION SYSTEM

[75] Inventor: Hiroshi Harano, Tokyo, Japan

[73] Assignee: NEC Corporation, Tokyo, Japan

[21] Appl. No.: 08/864,548

[22] Filed: May 28, 1997

[30] Foreign Application Priority Data

May 29, 1996 [JP] Japan .................................. 8-134523

[51] Int. Cl.[7] ............................ H04B 10/02; H04B 10/08
[52] U.S. Cl. .......................... 359/174; 359/177; 359/110
[58] Field of Search ..................... 359/110, 177

[56] References Cited

U.S. PATENT DOCUMENTS

| | | | |
|---|---|---|---|
| 2,590,054 | 3/1952 | Taylor, et al. | 149/46 |
| 2,657,977 | 11/1953 | Stengel, et al. | 423/266 |
| 2,943,982 | 11/1953 | Dahlin | 51/308 |
| 3,212,944 | 10/1965 | Lyon, et al. | 149/21 |
| 3,428,418 | 2/1969 | McFarlin, et al. | 423/275 |
| 4,001,377 | 1/1977 | Hahn, et al. | 423/267 |
| 4,263,850 | 4/1981 | Bouchard, et al. | 102/205 |
| 4,267,774 | 5/1981 | Hall, Jr. et al. | 102/201 |
| 4,372,210 | 2/1983 | Shaffer, et al. | 102/204 |
| 5,113,459 | 5/1992 | Grasso et al. | |
| 5,399,609 | 3/1995 | Moss | 524/423 |
| 5,436,750 | 7/1995 | Kawano | 359/177 |
| 5,793,510 | 8/1998 | Samejima et al. | 359/158 |

FOREIGN PATENT DOCUMENTS

| | | |
|---|---|---|
| 54-12307 | 1/1979 | Japan . |
| 56-94850 | 7/1981 | Japan . |
| 62-260439 | 11/1987 | Japan . |
| 4-314223 | 11/1992 | Japan . |
| 6-338874 | 12/1994 | Japan . |

*Primary Examiner*—Leslie Pascal
*Assistant Examiner*—Dalzid Singh
*Attorney, Agent, or Firm*—Scully, Scott, Murphy & Presser

[57] ABSTRACT

As an optical signal to be transmitted, a transmitting station 100 multiplexes a monitoring/control signal SC at a different optical wavelength to the main signal SM, and the optical signal is transmitted via at least two parallel optical transmission lines 10 and 20. A receiving station 200 can process the monitoring/control signal SC by separating it from the main signal MS, which thus need not be converted to an optical signal, and the circuit scale is not increased. In addition, a trouble occurring in either system may be coped with by adopting the optical system which is transmitted via the other system.

9 Claims, 3 Drawing Sheets

OPTICAL AMPLIFIER RELAY TRANSMISSION SYSTEM

BACKGROUND OF THE INVENTION

The present invention relates to an optical amplifier relay transmission system, especially to an optical amplifier relay transmission system using erbium-doped fiber amplifiers (EDFAs) capable of improving transmission of a monitoring/control signal used for the monitoring control of an optical system.

In the prior art transmission system of this type, the optical signal to be transmitted is amplified by the EDFAs in relay stations. A monitoring/control signal for monitoring and control of the optical signal is multiplexed to a main signal in an overhead of the optical signal and transmitted. For the monitoring and control of the optical signal, each relay station has to extract the monitoring/control signal that is inserted in the overhead of the optical signal. To this end, each relay station once converts the optical signal including the main signal into an electric signal, then separates the monitoring/control signal from the electric signal for predetermined processing of the separated monitoring/control signal. The relay station then multiplexes again the processed monitoring control signal to the main signal, then converts the multiplexed signal to an optical signal again, and amplifies the optical signal before transmission. Briefly, each relay station converts the main signal as well to an electric signal and converts the electric signal back to the optical signal. Therefore, a large scale optical signal processing circuit is required.

To overcome this drawback, a system has been proposed, in which an optical signal obtained through wavelength multiplexing using a different frequency from that of the main signal for the monitoring/control signal. In this system, the monitoring/control signal can be separated from the main signal by wavelength separating the optical signal, and the separated monitoring control signal may be subjected to a predetermined processing and wavelength multiplexed again afterwards. This is effective in view of reducing the processing circuit scale in each relay station.

In the prior art transmission systems of this type, a single transmission line constituted by an optical fiber is utilized for the optical signal transmission. Therefore, it is difficult to promptly cope with the occurrence of such troubles as breakage of the optical fiber or a transmission line error. To cope with this difficulty, a system is adopted, in which upon occurrence of a trouble in an optical transmission line, switching thereof over to another optical transmission line is executed. In this system, for realizing reliable transmission it is necessary, upon detection of a trouble, to re-transmit a signal which has been affected by the trouble. Therefore, the transmission efficiency of the system is inferior. Besides, in case when the monitoring/control signal fails to be transmitted, the system can no longer make monitoring or control, and the switching over to the redundant circuit noted above is inadequate to disable effective protection of the system against the trouble.

SUMMARY OF THE INVENTION

An object of the present invention is therefore to provide an optical amplifier relay transmission system capable of permitting protection of the monitoring control signal and improvement in signal transmission reliability.

According to an aspect of the present invention, there is provided an optical amplifier relay transmission system comprising a relay station having a function of amplifying an optical system transmitted via an optical transmission line, the optical signal being obtained through multiplexing of a monitoring control signal at a different optical wavelength from a main signal to the main signal, the optical signal being transmitted on at least two parallel optical transmission lines.

The relay station comprises separating means for separately the monitoring/control signal from the main signal in the optical signal, an erbium-doped fiber amplifier (EDFA) for optically amplifying the main signal, processing means for processing the separated monitoring/control signal, and multiplexing means for multiplexing the monitoring signal having been processed to the main signal again. The processing means converts the separated monitoring/control signal and converts the electric signal after processing thereof back to the optical signal. A terminal station includes four optical transmission lines as duplicate transmission lines for bi-directional transmission, and the relay station processes the monitoring/control signal contained in the optical system transmitted via all the four optical transmission lines. A station receiving the optical signal monitors errors in the monitoring/control signal through processing thereof, and selectively receives the optical signal transmitted on one of a plurality of optical transmission lines which can transmit good quality signal.

Other objects and features will be clarified from the following description with reference to attached drawings.

PREFERRED EMBODIMENTS OF THE INVENTION

An embodiment of the present invention will now be described with reference to the drawings.

Figure 1:
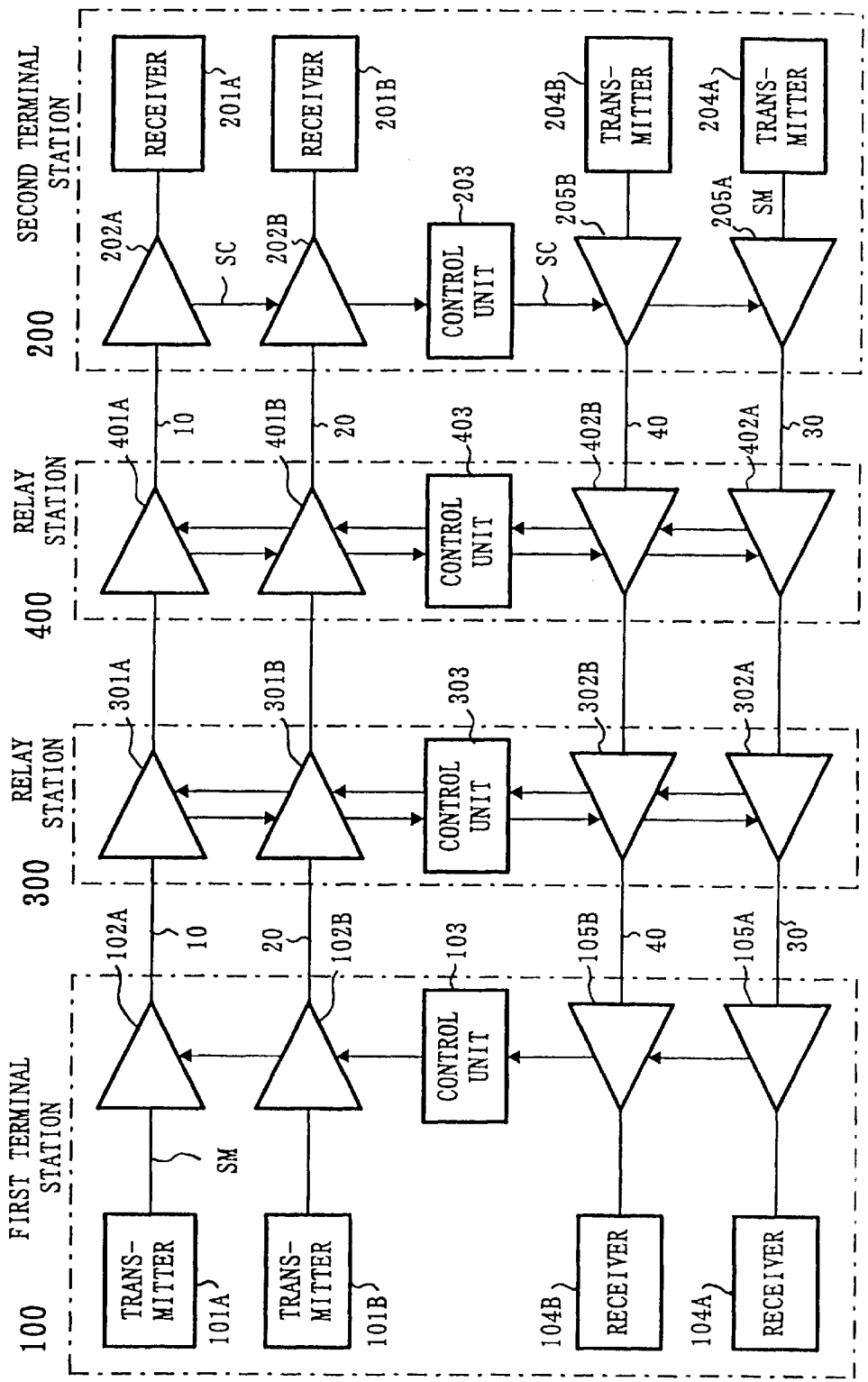
FIG. 1 is a block diagram showing the schematic construction of a system according to the present invention.

FIG. 1 is a block diagram showing the schematic construction of a system according to the present invention. A first terminal station 100 includes a first and a second transmitter 101A and 101B, which are provided in parallel and each converts a main signal SM to be transmitted into an optical signal. A first and a second optical amplifier 102A and 102B each amplifies the optical signal from each of the first and second transmitters 101A and 101B. The output of each of the optical amplifiers 102A and 102B is supplied to each of a first and a second optical transmission lines 10 and 20 constituted by optical fibers. The first terminal station 100 further comprises a control unit 103, which converts a monitoring/control signal SC into an optical signal at a different wavelength from that of the main signal SM and multiplexes the optical signal with the main signal SM, the resultant signal being supplied to the first and second optical transmission lines 10 and 20.

Relay stations 300 and 400 are connected to the first and second optical transmission lines 10 and 20 and amplify the transmitted optical signal. At this time, the main signal SM is amplified as the optical signal in the optical amplifiers 301A and 301B and 401A and 401B. The monitoring/control signal SC, however, is separated from the main signal SM and converted in the control units 303 and 403 into an electric signal for necessary processing. Afterwards, the monitoring/control signal is converted again to an optical signal, which is in turn multiplexed with the main signal.

In a second terminal station 200, each of the received optical amplifiers 202A and 202B amplifies the main signal SM in the received optical signal, and the outputs of the amplifiers 202A and 202B are received in receivers 201A and 201B. The monitoring control signal SC is separated from the main signal SM and converted in a control unit 203 into an electric signal for predetermined processing.

For line reliability improvement, the duplicate line is utilized. In the system as a whole, the duplication is made bi-directionally, and a total of four transmission lines are employed. Specifically, a third and a fourth optical transmission lines 30 and 40 are provided for optical signal transmission from the second terminal station 200 to the first terminal station 100. Like the first and second optical transmission lines, the main signal and monitoring/control signal are transmitted in the form of an optical signal on the transmission lines 30 and 40 via the relay stations 400 and 300. Designated at 204A and 204B are transmitters, at 205A and 205B optical amplifiers, 402A, 402B, 302A and 302B optical amplifiers, at 104A and 104B receivers, and 105A and 105B optical amplifiers.

Figure 2:
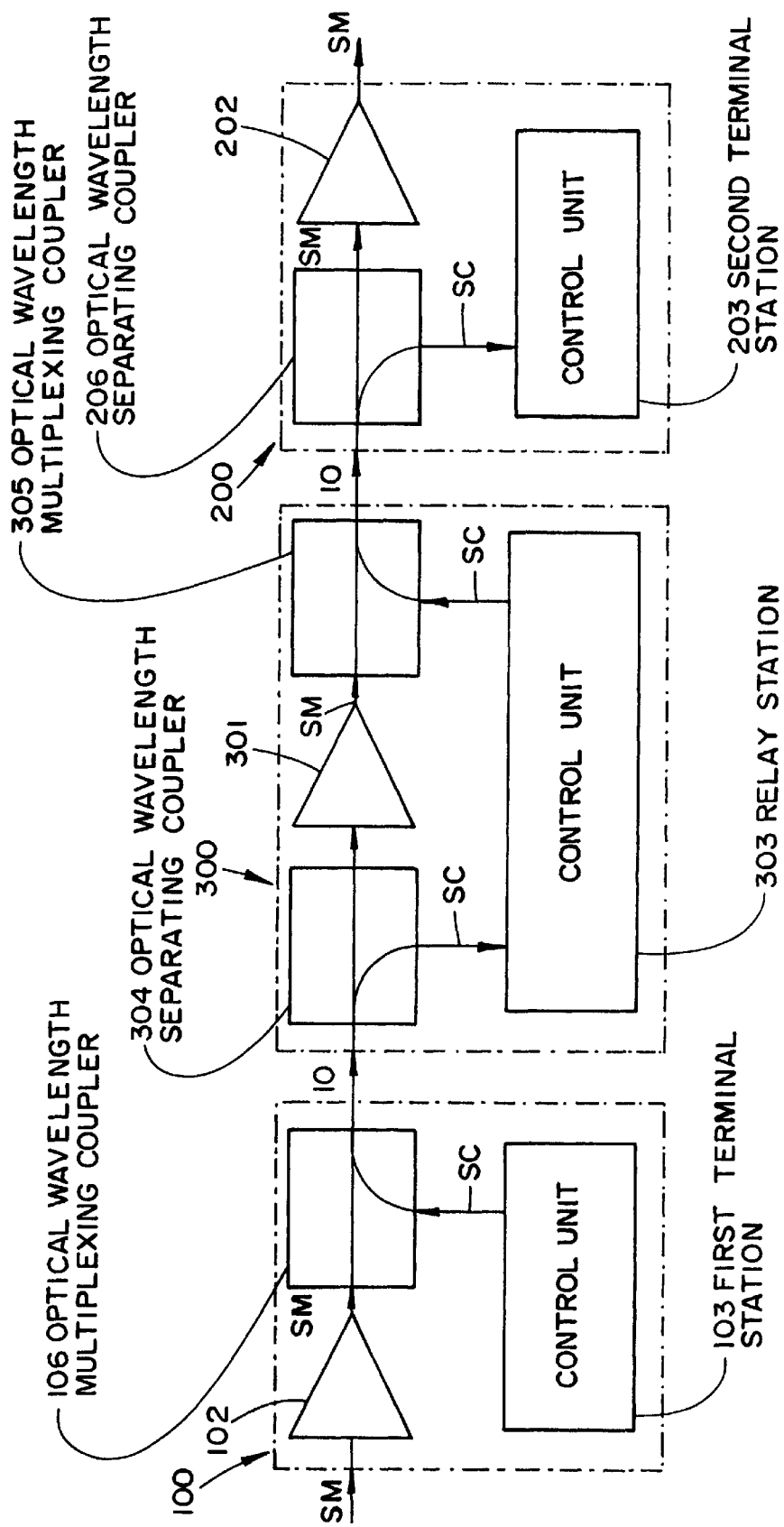
FIG. 2 is a block diagram of the system for transmitting the main signal SM and the monitoring/control signal SC via the optical transmission line 10 in FIG. 1.

FIG. 2 is a block diagram of the system for transmitting the main signal SM and the monitoring/control signal SC via the optical transmission line 10 through the first terminal station 100, relay station 300 (or 400) and second terminal station 200. The first terminal station 100 includes a transmitting optical amplifier 102 constituted by EDFA and an optical wavelength multiplexing coupler 106. The optical wavelength multiplexing coupler 106 combines and multiplexes the main signal SM constituted by an optical signal at one frequency, having been amplified by the transmitting optical amplifier 102, and the monitoring/control signal SC outputted as an optical signal at a different frequency from the control unit 103, and sends out the resultant multiplexed optical signal to the optical transmission line 10 constituted by an optical fiber.

The relay station 300 includes an optical wavelength separating coupler 304, an optical amplifier 301 constituted by an EDFA, and an optical wavelength multiplexing coupler 305. The optical wavelength separating coupler 304 separates the main signal SM and the monitoring/control signal SC from the optical signal received through the optical transmission line 10. The separated main signal SM is amplified by the optical amplifier 301 and then outputted to the optical wavelength multiplexing coupler 305. The separated monitoring/control signal SC is subjected in the control unit 303 to a predetermined processing. After the processing, it is again combined and multiplexed as an optical signal in the optical wavelength multiplexing coupler 305 with the output of the optical amplifier 301. The output of the multiplexing coupler 305 is supplied to the optical transmission line 10.

The second terminal station 200 includes an optical wavelength separating coupler 206, and an optical amplifier 202 constituted by an EDFA. The optical wavelength separating coupler 206 separates the main signal SM and the monitoring/control signal SC from the received signal. The separated main signal SM is amplified by the optical amplifier 202 and supplied to the receiver 201 (see FIG. 1). The separated monitoring/control signal SC is outputted to the control unit 203 for processing.

The monitoring/control signal in each station can be transmitted on all of the first to fourth optical transmission lines. In the duplicate first and second optical transmission lines 10 and 20 and third and fourth optical transmission lines 30 and 40, when the quality of one of the paired optical transmission lines is deteriorated, a good quality optical transmission line is automatically selected to improve the reliability of the monitoring/control signal. In addition, when all the optical transmission lines between adjacent stations are broken, monitoring and control of data up to that moment can be obtained from each of these stations.

Figure 3:
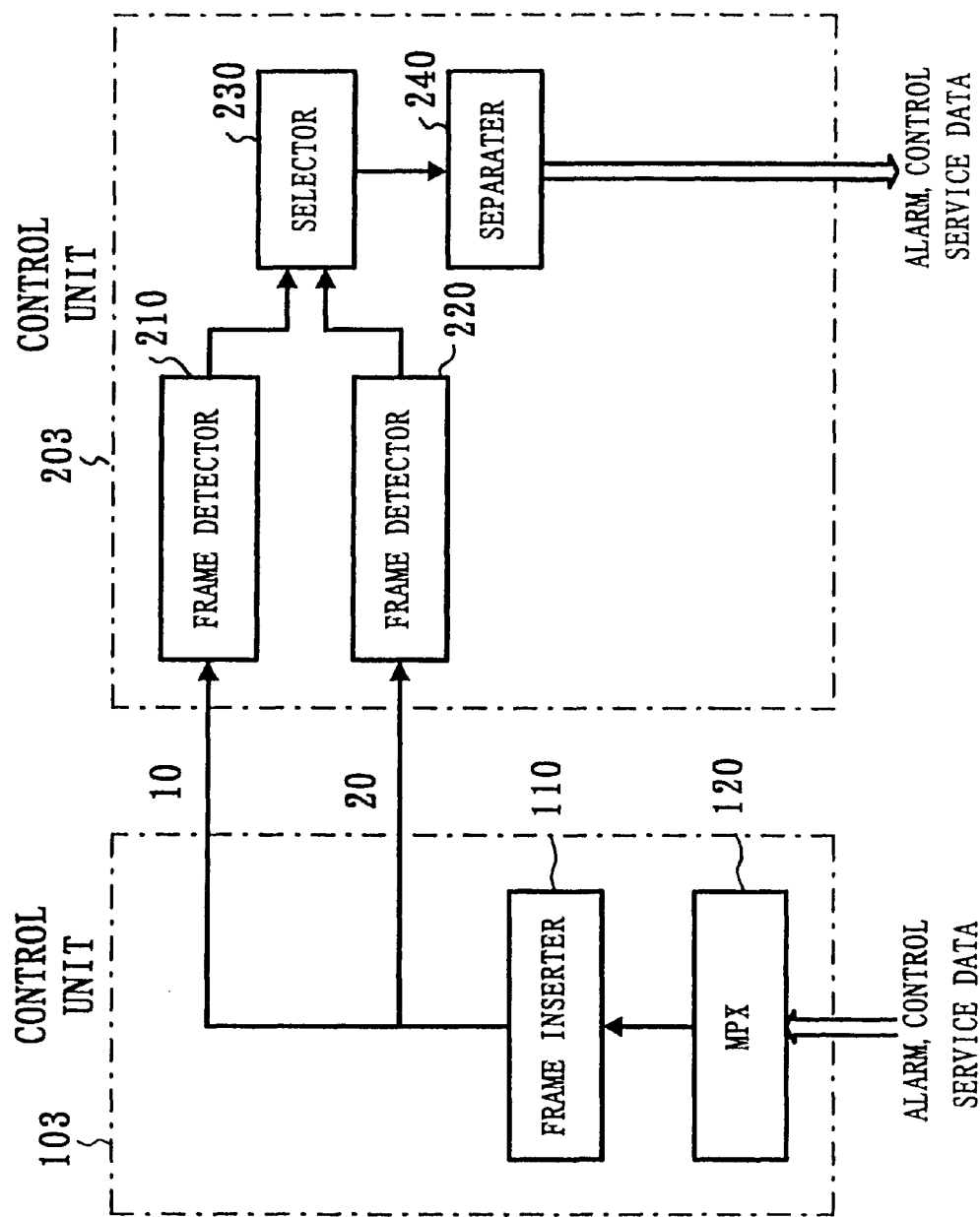
FIG. 3 is a duplication structure of the monitoring/control signal using the optical transmission lines 10 and 20 in FIG. 1.

FIG. 3 shows a duplication structure of the monitoring/control signal using the optical transmission lines 10 and 20. An alarm data remote station control signal of the system detected in the control unit 103 in the first terminal station 100, is multiplexed in a multiplexer 120 of the control unit, and a frame signal is inserted in the multiplexed signal by a frame inserting unit 110, the output thereof being supplied to the duplicated first and second optical transmission lines 10 and 20. The control unit 203 includes frame detectors 210 and 220, which monitor errors in transmitted data by detecting the frame signal received in the received signal. A selector 230 selects better quality one of data received via the two optical transmission lines 10 and 20. A separator 240 separates the alarm data to other stations and control signal to the own stations from the selected signal, the separated signals being used for the control of the own station and processing of alarm data of other stations.

As shown, in this system in which the monitoring/control signal at a different wavelength from that of the main signal is multiplexed with the main signal, a relay station can separate the monitoring signal from the main signal, convert the sole monitoring/control signal to an electric signal for necessary processing, and afterwards multiplexed again as an optical signal to the main signal for transmission to the next station. The relay station thus can amplify the main signal in the form of the optical signal, and the circuit scale of the relay station is not increased.

In this system in which a signal obtained as a result of multiplexing the main signal and the monitoring/control signal via two parallel optical transmission lines, when a trouble occurs in one of the optical transmission lines that is in use, the receiving side station can select the optical signal simultaneously transmitted via the other optical transmission line which is used as a redundant system. It is thus possible to realize signal transmission without re-transmission. Without re-transmission of signal, it is possible to prevent deterioration of the transmission efficiency.

In a long distance relay transmission system using optical amplifiers, usually an optical signal in the neighborhood of 1,550 nm with less transmission loss is used, and the signal is amplified using an EDFA which is capable of amplifying optical signal at 1,550 nm. In the case of FIG. 3, the monitoring/control signal is of an optical wavelength of approximately 1,300 nm, and since its data quantity is not so great, it is of about 1.5 Mb/s (for instance, corresponding to DS1). The optical interface used for the monitoring/control signal thus may be a usual transmitting optical interface. It further possible to use for the frame a frame format of DS1 which is extensively used in current low-speed interfaces. Detection of frame signal errors and parity errors is thus possible. The optical coupler used for the wavelength multiplexing may be either of 1,500 or 1,300 nm. The receiver detects frame signal errors and parity errors of DS1. When errors in excess of a certain specified amount of errors is detected, the monitoring/control signal is switched to one or the other one of the duplicate systems. It is further possible to transmit order wire signals and service data in addition to the monitoring/control signal.

As has been described in the foregoing, according to the present invention an optical signal which is obtained by multiplexing a monitoring/control signal at a different frequency from that of the main signal to the same is transmitted via optical transmission lines, i.e., two or more parallel optical transmission lines. A relay station thus can process the monitoring/control signal by separating it from the main signal, that is, it is not necessary to convert the main signal into an optical signal, and the circuit scale is not increased. In addition, a trouble that may occur in either system may be coped with by adopting the optical signal transmitted on a different system. It is thus possible to improve the reliability of transmission. Even in this case, it is not necessary to re-transmit the optical signal, so that it is possible to increase the transmission efficiency.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An optical amplifier relay transmission system comprising:

a relay station having a function of amplifying an optical signal transmitted via an optical transmission line, the transmitted optical signal being obtained through multiplexing of a monitoring/control signal at a different optical wavelength from a main signal to the main signal, the transmitted optical signal being transmitted on at least two parallel optical transmission lines, the relay station further having:

separating means for separating the monitoring/control signal from the main signal in the optical signal;

processing means for predetermined processing of the separated monitoring/control signal;

multiplexing means for multiplexing the processed monitoring/control signal to the main signal resulting in a multiplexed signal; and a frame inserting unit for inserting a frame signal in the multiplexed signal for monitoring errors in the transmitted signal, the output of the frame inserting unit being supplied to the at least two parallel optical transmission lines.

2. The optical amplifier relay transmission system according to claim 1, wherein the relay station further comprises an erbium-doped fiber amplifier (EDFA) for optically amplifying the main signal.

3. The optical amplifier relay transmission system according to claim 1, wherein the processing means converts the separated monitoring/control signal to an electric signal and converts the electric signal after processing thereof back to the optical signal.

4. The optical amplifier relay transmission system according to claim 3, wherein a terminal station includes four optical transmission lines as duplicate transmission lines for bi-directional transmission, and the relay station processes the monitoring/control signal contained in the optical system transmitted via all the four optical transmission lines.

5. The optical amplifier relay transmission system according to claim 4, wherein a station receiving the optical signal monitors errors in the monitoring/control signal through processing thereof, and selectively receives the optical signal transmitted on one of a plurality of optical transmission lines which can transmit good quality signal.

6. The optical amplifier relay transmission system according to claim 3, wherein a station receiving the optical signal monitors errors in the monitoring/control signal through processing thereof, and selectively receives the optical signal transmitted on one of a plurality of optical transmission lines which can transmit good quality signal.

7. The optical amplifier relay transmission system according to claim 1, wherein a terminal station includes four optical transmission lines as duplicate transmission lines for bi-directional transmission, and the relay station processes the monitoring/control signal contained in the optical system transmitted via all the four optical transmission lines.

8. The optical amplifier relay transmission system according to claim 7, wherein a station receiving the optical signal monitors errors in the monitoring/control signal through processing thereof, and selectively receives the optical signal transmitted on one of a plurality of optical transmission lines which can transmit good quality signal.

9. The optical amplifier relay transmission system according to claim 6, 8, or 5, wherein the station receiving the optical signal comprises:

a frame detector for each of the at least two parallel optical transmission lines for detecting the frame signal in each of the at least two parallel optical transmission lines; and a selector for selecting the better quality signal from the at least two parallel optical transmission lines.

* * * * *

UNITED STATES PATENT AND TRADEMARK OFFICE
CERTIFICATE OF CORRECTION

PATENT NO. : 6,151,148  
DATED : November 21, 2000  
INVENTOR(S) : H. Harabo

Page 1 of 1

It is certified that error appears in the above-identified patent and that said Letters Patent is hereby corrected as shown below:

<u>Column 6,</u>
Line 9, "3" should read -- 1 --
Line 15, "4" should read -- 3 --
Line 27, "1" should read -- 4 --
Line 33, "7" should read -- 5 --
Line 39, "6,8 or 5" should read -- 6, 7, or 8 --

Signed and Sealed this

Thirty-first Day of July, 2001

*Attest:*

NICHOLAS P. GODICI
*Attesting Officer*     Acting Director of the United States Patent and Trademark Office